(12) United States Patent
Russell (10) Patent No.: US 8,027,700 B2
(45) Date of Patent: *Sep. 27, 2011

(54) METHOD AND SYSTEM FOR FORWARDING COMMUNICATIONS

(75) Inventor: Alicia Marie Russell, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/790,020

(22) Filed: May 28, 2010

(65) Prior Publication Data

US 2010/0240343 A1    Sep. 23, 2010

Related U.S. Application Data (63) Continuation of application No. 10/668,617, filed on Sep. 23, 2003, now Pat. No. 7,769,392.

(51) Int. Cl.
*H04M 1/00* (2006.01)

(52) U.S. Cl. ............ 455/552.1; 455/417; 455/462; 455/459; 455/519; 379/211.03; 379/211.04; 379/211.05

(58) Field of Classification Search .......... 455/417, 455/462, 459, 519; 379/211.03–211.05
See application file for complete search history.

(56) References Cited

U.S. PATENT DOCUMENTS

| | | |
|---|---|---|
| 4,275,385 A | 6/1981 | White |
| 4,752,951 A | 6/1988 | Konneker |
| 4,932,050 A | 6/1990 | Davidson et al. |
| 4,935,927 A | 6/1990 | Kaewell, Jr. et al. |
| 4,989,230 A | 1/1991 | Gillig et al. |
| 5,127,042 A | 6/1992 | Gillig et al. |
| 5,155,759 A | 10/1992 | Saegusa et al. |
| 5,218,716 A | 6/1993 | Comroe et al. |
| 5,229,701 A | 7/1993 | Leman et al. |
| 5,247,567 A | 9/1993 | Hirano |
| 5,260,988 A | 11/1993 | Schellinger et al. |
| 5,353,331 A | 10/1994 | Emery et al. |
| 5,375,161 A | 12/1994 | Fuller et al. |
| 5,469,496 A | 11/1995 | Emery et al. |
| 5,515,366 A | 5/1996 | Chieu et al. |
| 5,550,895 A | 8/1996 | Burson et al. |
| 5,553,117 A | 9/1996 | Peterson et al. |
| 5,603,054 A | 2/1997 | Theimer et al. |

(Continued)

FOREIGN PATENT DOCUMENTS

EP    0 671859    9/1995

(Continued)

OTHER PUBLICATIONS

English Language Abstract of JP 9-98476.

(Continued)

*Primary Examiner* — Charles Shedrick
(74) *Attorney, Agent, or Firm* — Toler Law Group (57) ABSTRACT

A method includes receiving an identification value from a wireless beacon at a mobile device when the mobile device is within a detection area of the wireless beacon. The method also includes determining whether the wireless beacon is a recognized wireless beacon based on the identification value using a look up table accessible to the mobile device. An alternate communication address is selected from the look up table based on the identification value received from the wireless beacon, and communications addressed to the mobile device are redirected to the alternate communication address.

20 Claims, 6 Drawing Sheets

U.S. PATENT DOCUMENTS

| | | | |
|---|---|---|---|
| 5,636,243 | A | 6/1997 | Tanaka |
| 5,644,620 | A | 7/1997 | Shimura |
| 5,673,308 | A | 9/1997 | Akhavan |
| 5,745,850 | A | 4/1998 | Aldermeshian et al. |
| 5,748,147 | A | 5/1998 | Bickley et al. |
| 5,842,112 | A | 11/1998 | Fuller et al. |
| 5,950,133 | A | 9/1999 | Bledsoe |
| 5,995,839 | A | 11/1999 | Coursey et al. |
| 6,041,229 | A | 3/2000 | Turner |
| 6,069,588 | A | 5/2000 | O'Neill, Jr. |
| 6,073,031 | A | 6/2000 | Helstab et al. |
| 6,091,949 | A | 7/2000 | Sanchez |
| 6,125,126 | A * | 9/2000 | Hallensål .................. 370/522 |
| 6,130,938 | A | 10/2000 | Erb |
| 6,185,427 | B1 | 2/2001 | Krasner et al. |
| 6,188,888 | B1 | 2/2001 | Bartle et al. |
| 6,198,938 | B1 * | 3/2001 | Chavez, Jr. .................. 455/519 |
| 6,201,950 | B1 | 3/2001 | Fuller et al. |
| 6,208,854 | B1 | 3/2001 | Roberts et al. |
| 6,240,297 | B1 | 5/2001 | Jadoul |
| 6,301,350 | B1 | 10/2001 | Henningson et al. |
| 6,320,534 | B1 | 11/2001 | Goss |
| 6,332,082 | B1 | 12/2001 | Fuller et al. |
| 6,362,778 | B2 | 3/2002 | Neher |
| 6,373,817 | B1 | 4/2002 | Kung et al. |
| 6,389,117 | B1 | 5/2002 | Gross et al. |
| 6,389,288 | B1 * | 5/2002 | Kuwahara et al. ......... 455/456.6 |
| 6,424,840 | B1 | 7/2002 | Fitch et al. |
| 6,480,593 | B1 | 11/2002 | Munday et al. |
| 6,484,027 | B1 | 11/2002 | Mauney et al. |
| 6,505,055 | B1 | 1/2003 | Kalm et al. |
| 6,516,060 | B1 | 2/2003 | Foladare et al. |
| 6,574,213 | B1 | 6/2003 | Anandakumar et al. |
| 6,574,470 | B1 | 6/2003 | Chow et al. |
| 6,587,475 | B1 | 7/2003 | Przygienda |
| 6,587,683 | B1 | 7/2003 | Chow et al. |
| 6,600,734 | B1 | 7/2003 | Gernert et al. |
| 6,611,681 | B2 | 8/2003 | Henderson |
| 6,614,206 | B1 | 9/2003 | Wong et al. |
| 6,614,784 | B1 | 9/2003 | Glitho et al. |
| 6,618,590 | B1 * | 9/2003 | Howe .......................... 455/445 |
| 6,625,423 | B1 | 9/2003 | Wang |
| 6,650,088 | B1 | 11/2003 | Webb et al. |
| 6,704,580 | B1 | 3/2004 | Fintel |
| 6,735,432 | B1 | 5/2004 | Jarett et al. |
| 6,766,175 | B2 | 7/2004 | Uchiyama |
| 6,856,806 | B1 | 2/2005 | Bosik et al. |
| 6,892,083 | B2 | 5/2005 | Shostak |
| 6,975,713 | B1 | 12/2005 | Smith et al. |
| 6,978,154 | B1 | 12/2005 | Ospalak et al. |
| 6,978,163 | B2 | 12/2005 | Dyer et al. |
| 7,039,411 | B2 * | 5/2006 | Purdy et al. .................. 455/445 |
| 7,171,221 | B1 * | 1/2007 | Amin et al. .................. 455/462 |
| 7,466,811 | B2 * | 12/2008 | Elliott ...................... 379/201.02 |
| 7,613,142 | B2 * | 11/2009 | Molteni et al. ............... 370/328 |
| 2001/0019955 | A1 | 9/2001 | Henderson |
| 2002/0029258 | A1 | 3/2002 | Mousseau et al. |
| 2002/0111190 | A1 | 8/2002 | Harrison et al. |
| 2002/0115480 | A1 | 8/2002 | Huang |
| 2002/0119800 | A1 | 8/2002 | Haggers et al. |
| 2002/0137472 | A1 | 9/2002 | Quinn et al. |
| 2002/0164979 | A1 * | 11/2002 | Mooney et al. ............... 455/417 |
| 2002/0181442 | A1 | 12/2002 | Rajani |
| 2003/0003900 | A1 * | 1/2003 | Goss et al. .................... 455/417 |
| 2003/0039242 | A1 | 2/2003 | Moore, Jr. |
| 2003/0050051 | A1 | 3/2003 | Vilander |
| 2003/0073411 | A1 | 4/2003 | Meade, II |
| 2003/0092451 | A1 | 5/2003 | Holloway et al. |
| 2003/0117985 | A1 * | 6/2003 | Fujii et al. .................... 370/338 |
| 2003/0125075 | A1 | 7/2003 | Klovborg |
| 2003/0133421 | A1 | 7/2003 | Sundar et al. |
| 2003/0181202 | A1 | 9/2003 | Link et al. |
| 2004/0018774 | A1 | 1/2004 | Long et al. |
| 2004/0032484 | A1 | 2/2004 | Haltunen |
| 2004/0066776 | A1 | 4/2004 | Ishidoshiro |
| 2004/0072544 | A1 | 4/2004 | Alexis |
| 2004/0116073 | A1 | 6/2004 | Mauney et al. |
| 2004/0120492 | A1 | 6/2004 | Lew et al. |
| 2004/0127241 | A1 | 7/2004 | Shostak |
| 2004/0156491 | A1 | 8/2004 | Reding et al. |
| 2004/0203374 | A1 | 10/2004 | Zilliacus |
| 2004/0204056 | A1 | 10/2004 | Phelps, III |
| 2004/0208297 | A1 | 10/2004 | Valentine |
| 2004/0213212 | A1 | 10/2004 | Reding et al. |
| 2004/0258233 | A1 * | 12/2004 | Poustchi et al. ......... 379/211.02 |
| 2005/0054335 | A1 | 3/2005 | Pearson et al. |
| 2005/0064853 | A1 | 3/2005 | Radpour |
| 2005/0064855 | A1 | 3/2005 | Russell |
| 2005/0096024 | A1 | 5/2005 | Bicker et al. |
| 2005/0210101 | A1 | 9/2005 | Janik |
| 2005/0215243 | A1 | 9/2005 | Black et al. |
| 2005/0273781 | A1 | 12/2005 | Nakamura et al. |
| 2005/0277431 | A1 | 12/2005 | White |
| 2005/0282582 | A1 | 12/2005 | Slotznick |
| 2006/0003806 | A1 | 1/2006 | Weber |
| 2006/0031587 | A1 | 2/2006 | Patterson et al. |
| 2010/0178906 | A1 * | 7/2010 | Kennedy ...................... 455/417 |

FOREIGN PATENT DOCUMENTS

| | | |
|---|---|---|
| EP | 0 713345 | 5/1996 |
| GB | 2 305078 | 3/1997 |
| JP | 8-163646 | 6/1996 |
| JP | 8-172673 | 7/1996 |
| JP | 8-294168 | 11/1996 |
| JP | 8-294170 | 11/1996 |
| JP | 8-317468 | 11/1996 |
| JP | 8-322087 | 12/1996 |
| JP | 9-37345 | 2/1997 |
| JP | 9-55981 | 2/1997 |
| JP | 9-84117 | 3/1997 |
| JP | 9-98476 | 4/1997 |
| WO | 94/05101 | 3/1994 |

OTHER PUBLICATIONS

English Language Abstract of JP 9-84117.

English Language Abstract of JP 9-55981.

English Language Abstract of JP 9-37345.

English Language Abstract of JP 8-322087.

English Language Abstract of JP 8-317468.

English Language Abstract of JP 8-294170.

English Language Abstract of JP 8-294168.

English Language Abstract of JP 8-172673.

English Language Abstract of JP 8-163646.

Bluetooth Consortium, "Specification of the Bluetooth System: Profiles"; Dec. 1, 1999.

Haartsen, J., "Bluetooth: A New Radio Interface Providing Ubiquitous Connectivity", IEEE, pp. 107-111, Dec. 2000.

Schneiderman, R., "Bluetooth's Slow Down", IEEE, pp. 61-65, Dec. 1999.

Charney, Ben; "VoIP Maker Plans Cell Hybrid"; http://zdnet.com, News Software; Oct. 3, 2003. pp. 1-3.

International Search Report and Written Opinion of the International Searching Authority for PCT/US04/34239; Feb. 17, 2005; 10 pages.

International Search Report and Written Opinion of the International Searching Authority for PCT/US05/16449; Apr. 10, 2006; 11 pages.

International Search Report and Written Opinion of the International Searching Authority for PCT/US04/16017; Aug. 16, 2005; 7 pages.

International Search Report and Written Opinion of the International Searching Authority for PCT/US04/28260; Sep. 30, 2005; 10 pages.

International Search Report and Written Opinion of the International Searching Authority for PCT/US2005/016449; Jun. 15, 2006; 3 pages.

Verb Exchange Service—Tagline—One Number gets me everywhere; www.verbx.com/ssrv/service_tagline.html; 1 page.

Zbar, Jeff "Follow-me phone service keeps remote worker tethered to clients, co-workers"; NetworkWorldFusion; www. nwfusion.com/net.worker/columnists/2002/0826zbar,html; 3 pages.

www.officescape.com/services.asp; Follow-me phone; 1 page.

Callagenix "call diversion service"; www.callagneix.com/services/diversion.html; 3 pages.

Gupta, Puneet, "Short Message Service: What, How and Where?", Wireless Developer Network; www.wirelessdevnet.com/channels/sms/features/sms.html; 7 pages.

Webopedia; "Short Message Service"; www.webopedia.com/TERM/S/Short_Message_Service.html; 3 pages.

"Cellular Phone and Roaming Service"; www.members.tripod.com/peacecraft/infomining/cellphon.htm; 19 pages.

* cited by examiner

METHOD AND SYSTEM FOR FORWARDING COMMUNICATIONS

CLAIM OF PRIORITY

This application is a continuation of and claims priority from U.S. patent application Ser. No. 10/668,617, now U.S. Pat. No. 7,769,392, filed Sep. 23, 2003, which is incorporated herein by reference in its entirety.

FIELD OF THE DISCLOSURE

The present disclosure relates generally to wireless communication, and specifically to call forwarding requests for wireless communications.

BACKGROUND

Network integration applications supporting call routing between wireless and wireline telephones for single end-users typically fall into one or more service capabilities such as call forwarding and Find Me-Follow Me services. Find Me-Follow Me service provides end-users with a capability to manage communications by allowing them to determine how, when, and by whom they can be reached.

Find Me-Follow Me service applications enable users to define profiles based on a wide variety of parameters via a telephone or a Web-based interface. Typically, users select a combination of different phone numbers in a user defined search order for delivery of calls. For example, users who are going to be away from the office can set preferences that enable the system to first transfer important calls to a mobile phone number, then a pager, and then home if no one answers at the office. Generally, if no pick up occurs at the final destination, the caller can be transferred to voicemail.

Multiple call-diversion lists or profiles generally require a user to specify numerous destination numbers. Profiles may be set up by a service system administrator, and are then activated by the telephone user. A Find Me-Follow Me type service typically has an associated PIN code or Personal Number (access number) profile. With a PIN code, a user dials their access number and lets it ring until it picks up, then enters their PIN code and gains access to a menu, where the user can change their callback number. When someone calls a telephone that has a Personal Number profile enabled, the profile selected predetermines which numbers will be called and in which order. For example, one profile could try a user's office telephone, and if no answer, a user's home phone, then cell phone, and if still no answer, the call could be sent to the user's voice mail.

Find Me-Follow Me applications often require time-consuming and inconvenient initial multiple number profiles to be set up, as well as periodic input from a user to change their callback number.

BRIEF DESCRIPTION OF THE DRAWINGS

Specific embodiments are shown and described with respect to the drawings presented herein. It will be appreciated that for simplicity and clarity of illustration, elements illustrated in the Figures have not necessarily been drawn to scale. For example, the dimensions of some of the elements are exaggerated relative to other elements for clarity. The use of the same reference symbols in different drawings indicates similar or identical items, and wherein.

DETAILED DESCRIPTION

In a particular embodiment, a method includes receiving an identification value from a wireless beacon at a mobile device when the mobile device is within a detection area of the wireless beacon. The method also includes determining whether the wireless beacon is a recognized wireless beacon based on the identification value using a look up table accessible to the mobile device. The method further includes selecting an alternate communication address from the look up table based on the identification value received from the wireless beacon. The method also includes causing communications addressed to the mobile device to be redirected to the alternate communication address.

A particular embodiment includes a system that includes a wireless communication device. The wireless communication device includes a first receiver to facilitate two-way voice communication using a first wireless protocol, a second receiver to facilitate monitoring wireless information using a second wireless protocol, and a communication interface. The communication interface includes a first control module to provide a first request to forward communications to an alternate communication device when a transmitter identifier received by the second receiver from a transmitter is recognized based on a look up table accessible to the wireless communication device. A network address of the alternate communication device is determined based on the transmitter identifier.

A particular embodiment includes a wireless beacon having a wireless communication interface configured to wirelessly transmit a unique identification of the wireless beacon to a wireless mobile device located within a wireless beacon coverage area of the wireless beacon. When the unique identification is recognized based on a look up table accessible to the wireless mobile device, the wireless mobile device selects an alternate network address corresponding to the unique identification and forwards external communications to the alternate network address while the wireless mobile device is within the wireless beacon coverage area.

The present disclosure is generally directed to the provision of an integrated wireless and wireline communications system and methods thereof. The system and methods disclosed herein offer users convenience and flexibility by providing wireless location based routing to an alternate telephone destination such as a landline (wireline) telephone termination. The location based routing is provided automatically simply by placing the mobile telephone handset in proximity to a detector located near the alternate telephone destination. In addition, other conventional service-rich features such as distinctive ring, caller identification/privacy management and a common voicemail service for a user's wireless and wireline telephones are also possible when utilizing the system and methods disclosed herein.

Additionally, a method is disclosed for receiving an identifier from a source at a wireless mobile communication device over a first wireless connection, and communicating a request to a wireless switch to forward voice communications destined for a mobile telephone number to an alternate network via an alternative phone number (a call forwarding number) in response to receiving the identifier. Both the mobile telephone number and the alternative phone number may deliver calls to the same physical communications device if it is a multi-mode phone that can operate in both a wide area mobile network and a landline network. An example would be a dual-mode GSM-cordless phone. The source is proximal to the wireless mobile communications device. The method includes receiving a wireless communication over a second wireless connection having a protocol different than the first wireless connection. The method further includes determining when to withdraw the request to forward voice communications.

Figure 1:
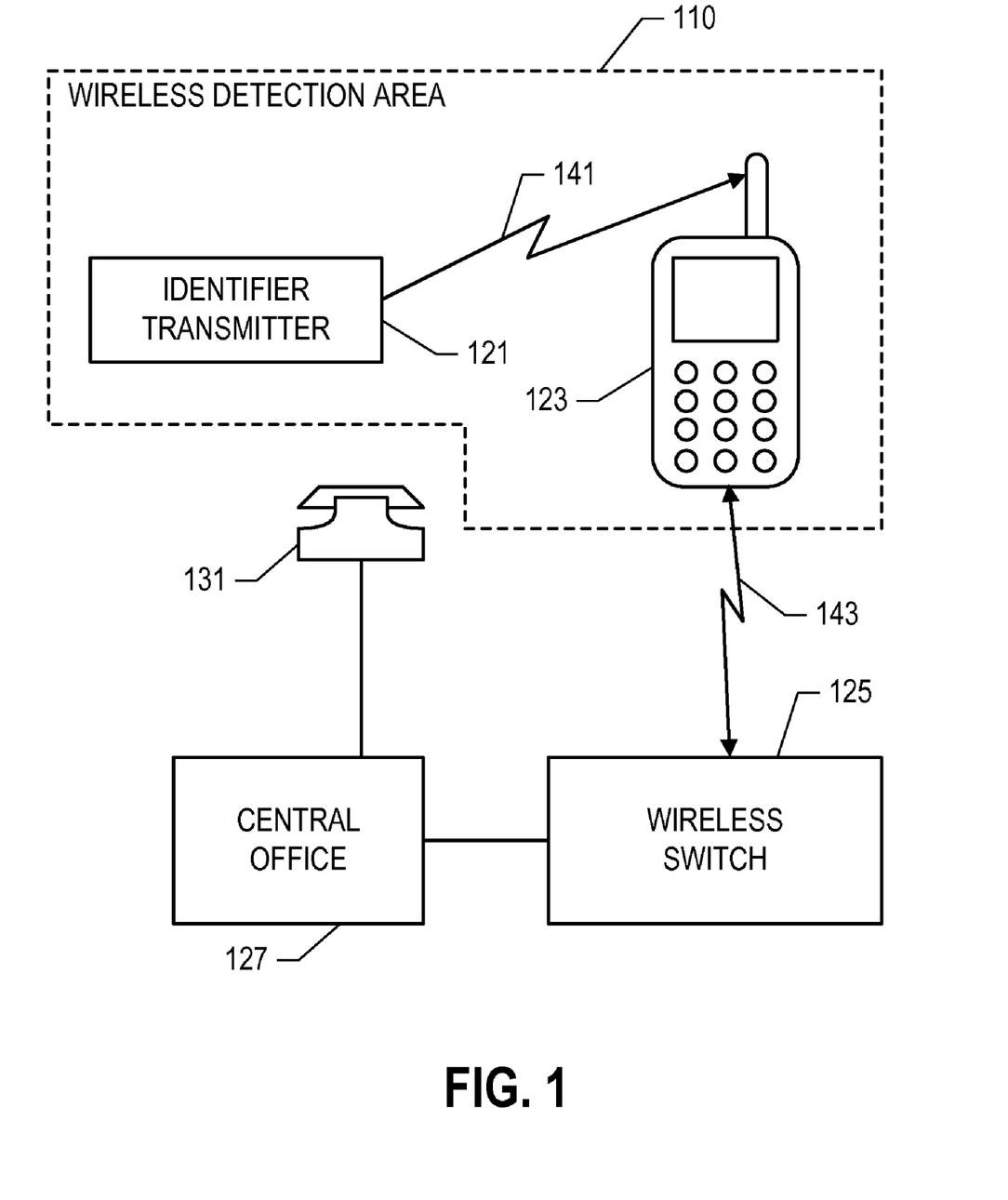
FIG. 1 is a block diagram illustrating an embodiment of an integrated wireless and wireline communication system.

Specifically, FIG. 1 illustrates, in block diagram form, an embodiment of an integrated wireless/wireline communication system. The integrated wireless/wireline communication system includes a mobile communication device (e.g., a mobile telephone 123) and an identifier transmitter 121 within a wireless detection area 110. The wireless detection area 110 may be provided by a wireless beacon that incorporates the identifier transmitter 121. A communication interface may be located inside the mobile telephone 123.

The system further includes a wireless switch 125, such as a cellular wide area switch, which communicates with an alternate telephone destination 131 via an intermediary switch in a telephone service provider central office 127. The identifier transmitter 121 communicates with the mobile telephone 123 via transmission signal 141. The wireless switch 125 communicates with the mobile telephone 123 via a signal 143. In an embodiment, the alternate telephone destination 131 is a telephone number correlated with a landline telephone located in proximity to the identifier transmitter 121 and the mobile telephone 123. The term proximity as used herein identifies the physical placement of the mobile telephone 123 within a coverage area of the wireless beacon device or identifier transmitter 121 (e.g., within the wireless detection area 110). The wireless beacon device or identifier transmitter 121 may indicate proximity of the mobile telephone 123 to a landline telephone.

In one embodiment, the transmission signal 141 from the identifier transmitter 121 utilizes a wireless data protocol. The wireless data protocol may be the IEEE 802.11 standard wireless protocol, the Bluetooth standard protocol, or other wireless data protocols employed in the telecommunications industry. Generally, the signal 143 between the mobile telephone 123 and the wireless switch 125 will include a wireless data message protocol, such as the Short Message Service (SMS) protocol. The wireless data message may be carried over various packet channels using protocols such as a Global System for Mobile communication (GSM) control channel, General Packet Radio Service (GPRS), universal Mobile Telecommunications Systems (UMTS) data, and CDMA2000/CDMAOne, as are known in the art.

In one exemplary embodiment, the mobile (e.g., wireless) telephone 123 may have Bluetooth functionality such as a class 3 type communication circuitry. The wireless beacon or identifier transmitter 121 may transmit a unique code using wireless data techniques, such as Bluetooth class 1 type communication. When in proximity to the wireless beacon or identifier transmitter 121, the mobile telephone 123 may receive the unique code from the identifier transmitter 121. A module within the mobile telephone 123 determines which network address is associated with the wireless beacon or identifier transmitter 121. The network address may, for example, be a landline telephone number or an Internet Protocol (IP) address for Phone Over IP calling. Alternately, the network address may be transmitted as part of the unique code associated with the wireless beacon or identifier transmitter 121. The mobile telephone 123 may then send an SMS message via a wireless channel to facilitate call forwarding. Once the mobile telephone 123 leaves the coverage area (e.g., the wireless detection area 110) of the wireless beacon or identifier transmitter 121, the mobile telephone 123 may send a cancel call forwarding signal.

Utilizing multiple beacons, calls to the mobile telephone 123 may be forwarded to associated landline phones when in various locations. For example, a user may have one wireless beacon located at home and another at work. Each wireless beacon may have a different unique identifier or may transmit a different forwarding address. The wireless phone may selectively activate and deactivate call forwarding by sending messages that include a network address associated the identified beacon.

The wireless beacon may also be used in conjunction with multiple wireless phones. Each phone may activate and deactivate call forwarding as it enters and leaves the wireless beacon coverage area. In some embodiments, each phone may activate a distinctive ring utilized when a call is forwarded from such phone to the alternate landline telephone. In other embodiments, each of the multiple wireless beacons may communicate additional coding to identify the network address. In further embodiments, wireless phones may selectively activate call forwarding when in proximity to a wireless beacon. If the wireless phone recognizes the identity of the wireless beacon, the wireless phone may activate and deactivate call forwarding when entering and leaving the wireless beacon coverage area. However, if the identity of the wireless beacon is not recognized or if color coding does not match the value expected by the wireless phone, the wireless phone may ignore the wireless beacon. In such an example, a wireless telephone may enter an area covered by multiple wireless beacons and only respond to a single designated beacon.

To ensure that only authorized mobile devices may initiate call forwarding into the alternate network designated by the beacon, the beacon signal may be encrypted so that only mobile devices with the correct public key can decrypt the signal and read the beacon identifier. Various methods exist for provisioning the beacon identifier and public key within the mobile device. One approach would be to run a short activation procedure between the beacon and the mobile phone using the first communications protocol. Further protection can be added so that a user login password is required to begin the activation procedure so that only the authorized user of the beacon may activate new mobile devices.

The illustrated embodiment of FIG. 1 depicts a mobile communication device (e.g., the mobile telephone 123) and a landline telephone (e.g., the alternate telephone destination 131). However, the concept may be generalized to call forwarding from one network address to a network address associated with a different network. In another alternate embodiment, a multi-modal device may communicate using different networks depending on location such as a dual-mode GSM-cordless phone.

Figure 2:
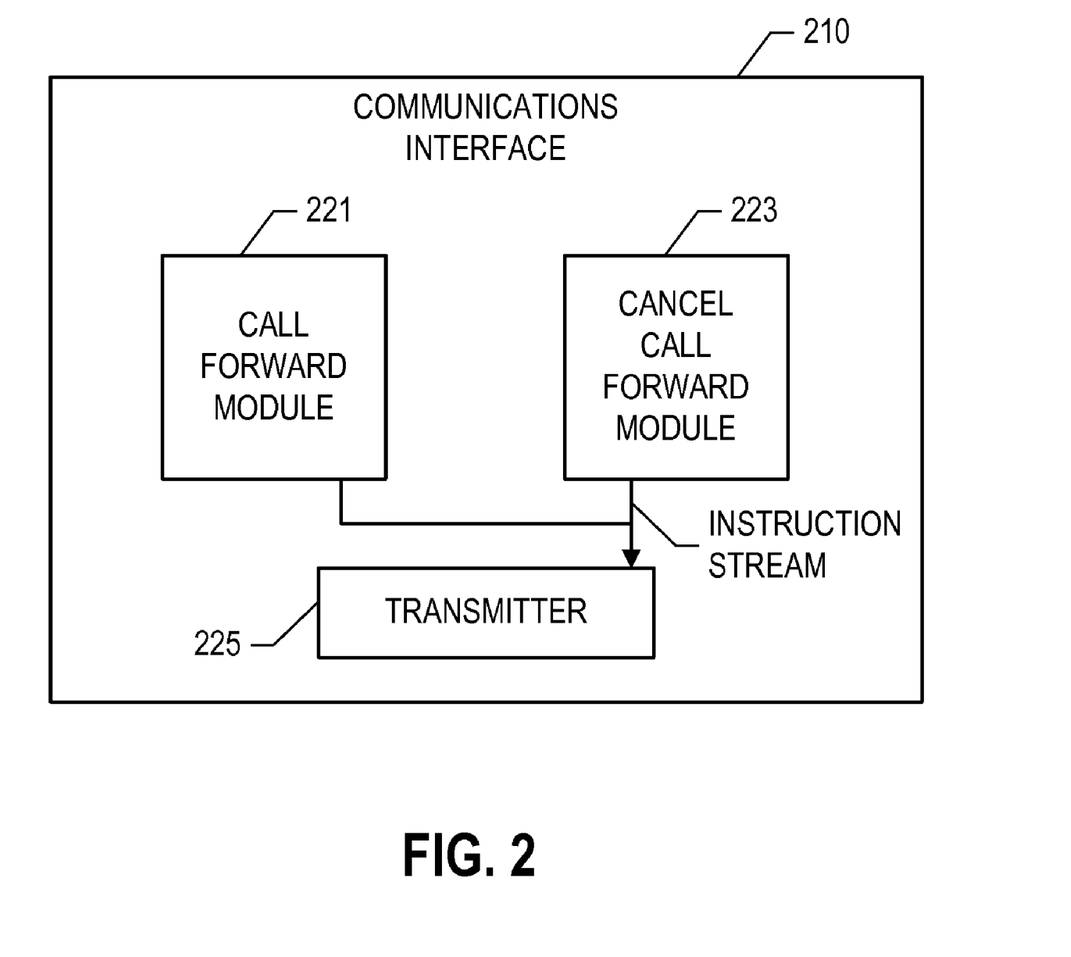
FIG. 2 is a block diagram illustrating a communications interface for use in connection with the communication system of FIG. 1.

FIG. 2 is a block diagram illustrating a communications interface 210. The communications interface 210 may be located inside a mobile wireless communication device, such as the mobile telephone 123 (e.g., a cellular phone accessible by a specific phone number) in FIG. 1. In one embodiment, the wireless communication device has a first receiver to facilitate two-way telephone conversations using a first wireless protocol, and a second receiver to facilitate monitoring wireless information using a second wireless protocol. The communications interface 210 comprises a first control module, call forwarding module 221, and a second control module, cancel call forwarding module 223, which send their respective instruction streams to a transmitter 225. The transmitter 225 transmits an identifier using a first wireless protocol such as those packet channel protocols listed above and a data message protocol such as SMS messages.

The call forwarding module 221 receives a request to forward incoming communications requests to an alternate communication device proximal to the transmitter 225. The cancel call forwarding module 223 cancels a prior call forwarding instruction to an alternate communication device by providing a request to provide communication requests directly to the wireless communication device.

In one exemplary embodiment, the modules 221 and 223 are modules in a wireless phone. For example, the call forwarding module 221 may identify a wireless beacon and send a call forwarding message associated with a phone number or network address associated with the wireless beacon. Multiple beacons with different identifiers may then be used to transfer calls depending on the proximity of the phone. For example, a user may have a beacon with one identifier at home and a second beacon with a different identifier at the office. The call forwarding module 221 may include a look up table to determine the appropriate forward to number or the number may be included as part of the beacon identifier.

In such an embodiment, more than one wireless phone may utilize the beacon in conjunction with either the call forwarding or the cancel call forwarding modules stored on each of the phones. Each of the wireless phones may initiate call forwarding to the same landline phone. In some embodiments, distinct rings may be implemented for calls associated with differing wireless phones.

Figure 3:
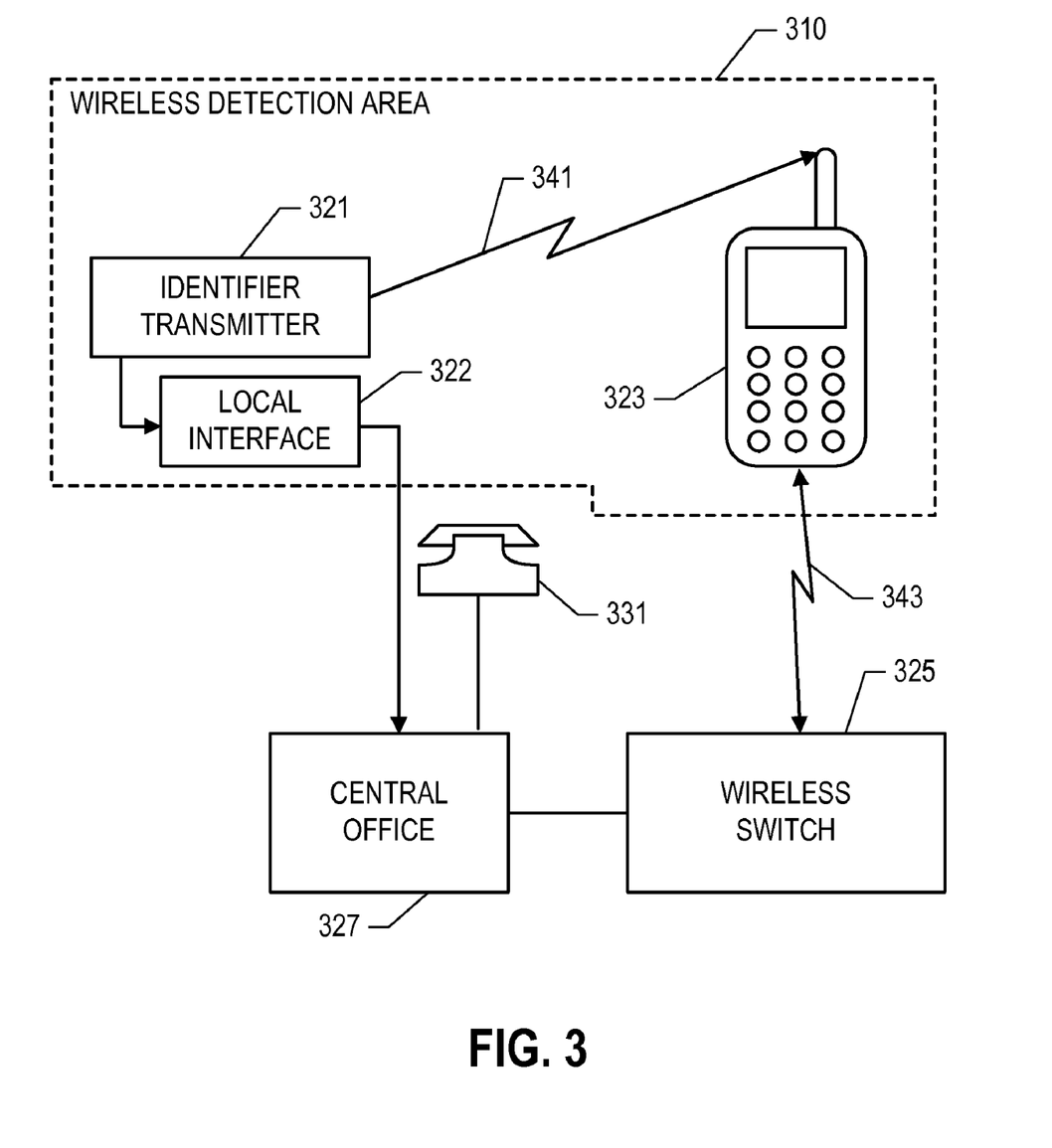
FIG. 3 is a block diagram illustrating an embodiment of an integrated wireless and wireline communication system.

FIG. 3 illustrates, in block diagram form, an embodiment of an integrated wireless/wireline communication system. The integrated wireless/wireline communications system includes a mobile telephone 323 and an identifier transmitter 321 within a wireless detection area 310. The wireless detection area 310 may be provided by a wireless beacon that incorporates the identifier transmitter 321. The integrated wireless/wireline communications system further includes a wireless switch 325, which communicates with an alternate telephone destination 331 via an intermediary switch in a telephone service provider central office 327. The identifier transmitter 321 communicates with the mobile telephone 323 via transmission signal 341. The wireless switch 325 communicates with the mobile telephone 323 via a signal 343. The identifier transmitter 321 is connected to the central office 327 via a local interface 322.

Figure 4:
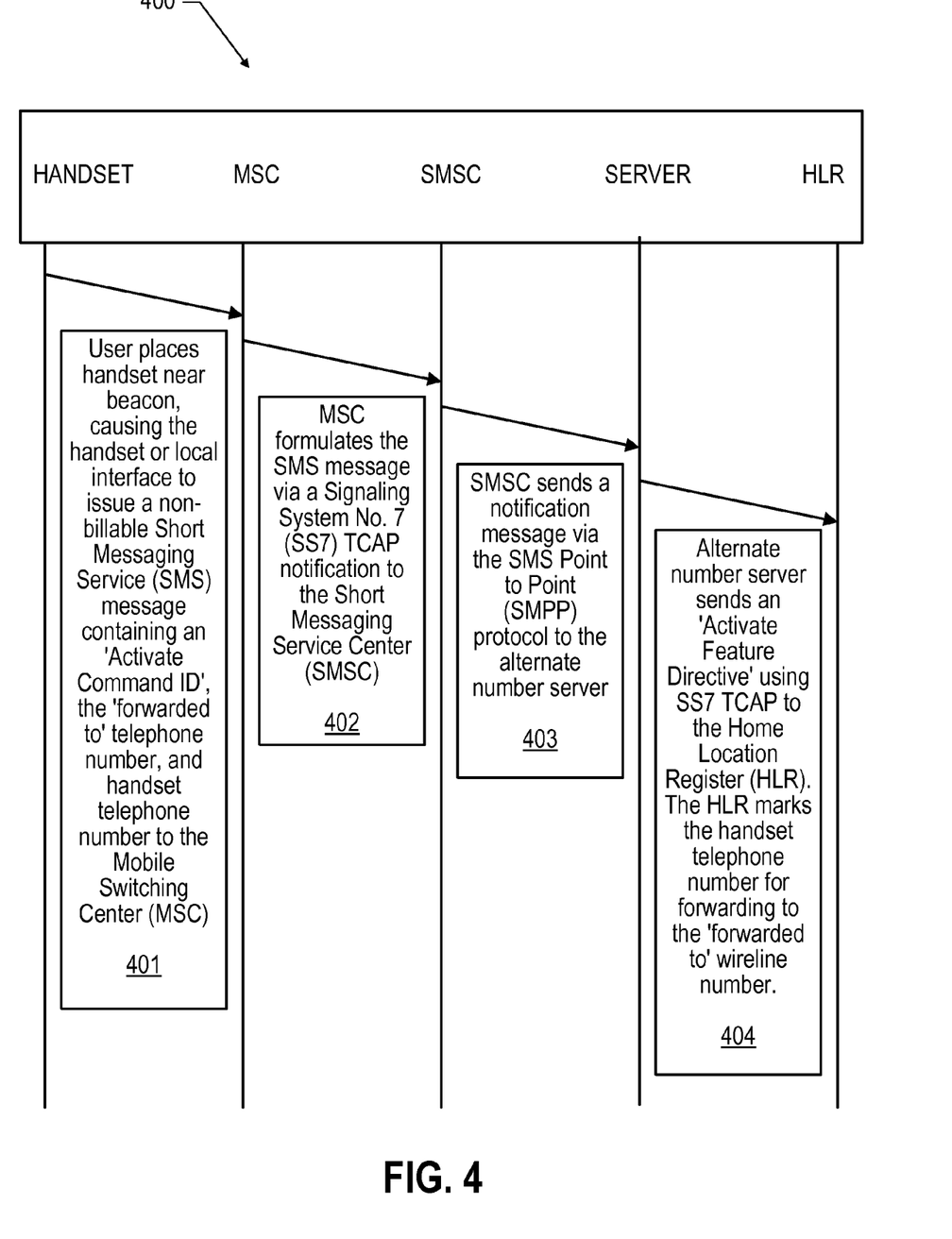
FIG. 4 is a sequence flow diagram illustrating feature activation for an integrated wireless and wireline communication system.

FIG. 4 is a sequence flow diagram illustrating feature activation for an integrated wireless and wireline communication system. The example provided in FIG. 4 illustrates a system 400 containing a handset, i.e., a mobile phone or local interface, a mobile switching center (MSC), a short messaging service center (SMSC), an alternate number server, and a home location register (HLR). In step 401, a user places their handset near a wireless beacon, which causes the handset to issue a non-billable short messaging service (SMS) message containing an 'Active Command ID,' the 'forwarded to' telephone number, and the handset telephone number to the MSC. The MSC formulates the SMS message via a signaling system No. 7 (SS7) TCAP notification to the SMSC, in step 402.

In step 403, the SMSC then sends a notification message via the Short Message Point to Point (SMPP) protocol to the alternate number server. The alternate number server, in step 404, sends an 'Activate Feature Directive' using SS7 TCAP to the HLR. The HLR marks the handset telephone number for forwarding to the 'forwarded to' number, such as to a proximate wireline telephone number.

Figure 5:
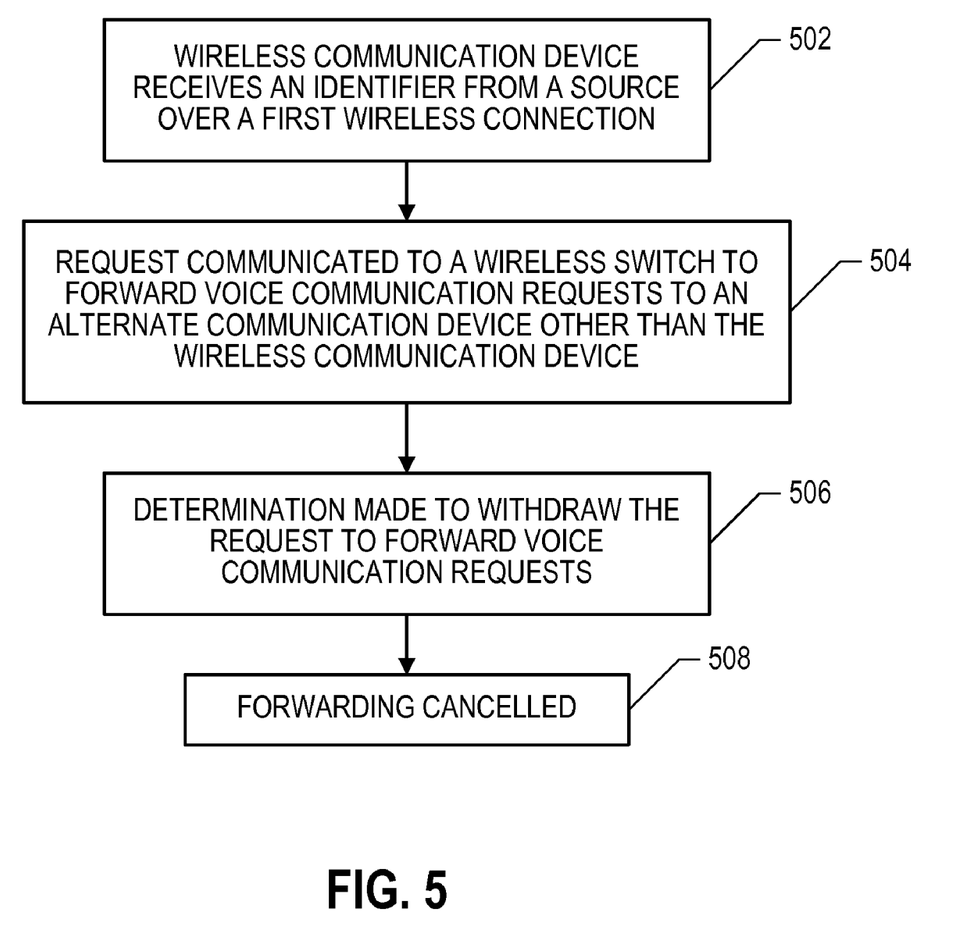
FIG. 5 is a flow diagram of a method for integrating wireless communications devices and alternate communication devices.

FIG. 5 is a flow diagram of a method for integrating wireless communications devices and alternate communication devices. In step 502, a wireless mobile communication device, which may be a cellular phone, a pager, a personal digital assistant (PDA), or other mobile communication device, receives an identifier from a source, such as a wireless beacon, over a first wireless connection. In an embodiment, the source is proximal to the wireless mobile communication device. The first wireless connection may utilize the IEEE 802.11 or Bluetooth wireless standards.

In step 504, a call forwarding request is automatically communicated to a wireless switch, e.g., a cellular switch, to forward voice communication requests to an alternate communication device in response to receiving the identifier of step 502. The request to the wireless switch may be made using a second wireless protocol, such as SMS over a GSM channel. The alternate communication device is different from the wireless communication device, and may be a wireline (landline) telephone located proximal to the source and the wireless communication device. In a particular embodiment, the wireless mobile communication device receives a wireless communication having a different protocol than the first wireless communication. In a particular embodiment, the identifier may be a user-selected unique radio frequency identification (RFID).

In particular embodiments, the wireless mobile communication device may communicate with the wireless switch via non-voice data messaging such as the short message services (SMS) protocol.

Once steps 502 and 504 have been carried out, incoming calls destined for the wireless mobile communication device are forwarded to the alternate communication device until a determination has been made to withdraw the request for call forwarding to the alternate communication device, as in step 506. In an embodiment, the call forward request is withdrawn when the wireless mobile communication device no longer receives the identifier (e.g. where the mobile phone is moved outside the range of the beacon). In another embodiment, the call forwarding request is withdrawn in response to a user action. The user action can be a key sequence entered using a keypad of the wireless mobile communication device or a voice request. In step 508 forwarding has been cancelled, and incoming communication requests are again directed to the wireless mobile communication device.

Figure 6:
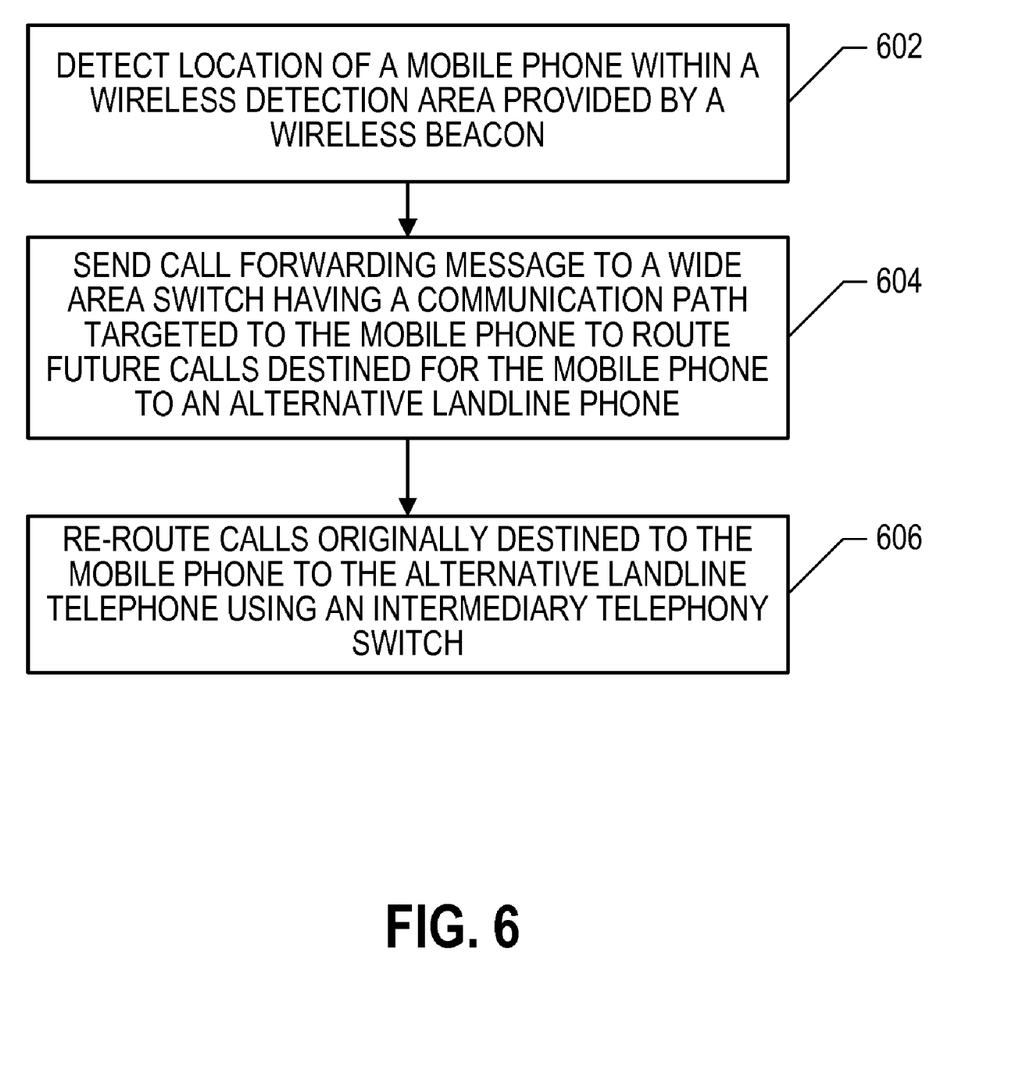
FIG. 6 is a flow diagram of a method for utilizing wireless data communications to send routing messages to an alternate telephony destination.

FIG. 6 is a flow diagram of a method for selecting a destination telephone utilizing wireless data communications to send routing messages to an alternate telephony destination. In step 602, detection of the location of a mobile telephone within the wireless detection area provided by a wireless beacon is conducted. When detected, a call forwarding message is sent to a wide area switch (e.g., a cellular switch) having a wireless communication path targeted to the mobile telephone, as in step 604. The call forwarding message provides an instruction to route future calls destined for the mobile telephone to an alternative communication path. In a particular embodiment, the alternative communication path is a landline telephone number. The landline telephone number is associated with a landline connection to a landline telephone located within the same residence as the wireless beacon.

Referring to step 606, calls originally destined to the mobile telephone are re-routed using an intermediary telephone switch, i.e., a switch located in a central office such as central office 127, 327. Re-routing continues unless cancelled by a user action, or by moving the mobile telephone outside of the wireless detection area provided by the wireless beacon.

In a particular embodiment, detecting the location of the mobile telephone is based upon communication using a wireless data protocol, which may be compliant with an IEEE 802.11 standard, or a Bluetooth standard. The call forwarding message of step 504 may be communicated to the wide area switch using a wireless data message protocol such as SMS via channels using protocols such as GSM, GPRS, CDMA, or UMTS.

In various embodiments, the wireless phone or wireless communication device may take various forms including personal digital assistants with built in communications circuitries, wireless telephones, cellular telephones, mobile telephones, and other wireless devices.

The methods and system described herein provide for an adaptable implementation. Although certain embodiments have been described using specific examples, it will be apparent to those skilled in the art that the disclosure is not limited to these few examples. Additionally, various types of wireless transceivers, transmitters, receivers, and protocols are currently available which could be suitable for use in employing the methods as taught herein. Note also, that although certain illustrative embodiments have been shown and described in detail herein, along with certain variants thereof, many other varied embodiments may be constructed by those skilled in the art. The benefits, advantages, solutions to problems, and any element(s) that may cause any benefit, advantage, or solution to occur or become more pronounced are not to be construed as a critical, required, or essential feature or element. Accordingly, the present disclosure is not intended to be limited to the specific form set forth herein, but on the contrary, it is intended to cover such alternatives, modifications, and equivalents, as can be reasonably included within the scope of the disclosure as provided by the claims below.

What is claimed is:

1. A method, comprising:
    receiving an identification value from a wireless beacon device at a mobile device when the mobile device is within a detection area of the wireless beacon device, wherein the identification value identifies the wireless beacon device;
    determining, at the mobile device, whether the wireless beacon device is a recognized wireless beacon device based on the identification value using a look up table accessible to the mobile device;
    selecting, at the mobile device, an alternate communication address that is associated with a second communication device from the look up table based on the identification value received from the wireless beacon device, wherein the second communication device is different from the wireless beacon device; and
    in response to selecting the alternate communication address at the mobile device, causing communications addressed to the mobile device to be redirected to the second communication device via the alternate communication address.

2. The method of claim 1, wherein causing the communications addressed to the mobile device to be redirected to the alternate communication address comprises sending a forwarding request to a wireless switch from the mobile device.

3. The method of claim 1, wherein the identification value comprises a user selected identification.

4. The method of claim 1, wherein the mobile device comprises a mobile telephone device.

5. The method of claim 1, wherein the mobile device receives the identification value using a Bluetooth receiver.

6. The method of claim 1, further comprising:
    determining to cease redirecting communications to the alternate communication address; and
    causing redirection of the communications to the alternate communication address to cease.

7. The method of claim 6, wherein the determination to cease redirecting the communications is made in response to determining that the mobile device has ceased to receive the identification value from the wireless beacon device.

8. The method of claim 6, wherein the determination to cease redirecting the communications is made in response to a user action.

9. The method of claim 1, wherein the mobile device comprises a multi-mode telephone capable of communicating via a wireline network and via a wireless network, and wherein the alternate communication address is a network address of the mobile device on the wireline network.

10. A system, comprising:
    a wireless communication device comprising a first receiver to facilitate two-way voice communication using a first wireless protocol, a second receiver to facilitate monitoring of wireless information using a second wireless protocol, and a communications interface, the wireless communication device comprising:
        a first control module to provide a first request to forward communications to an alternate communication device when an identifier received by the second receiver from a wireless beacon device is recognized based on the identifier matching an entry in a look up table accessible to the wireless communication device, wherein the identifier identifies the wireless beacon device and wherein a network address of the alternate communication device is determined based on the identifier.

11. The system of claim 10, wherein the alternate communication device is proximal to the wireless beacon device.

12. The system of claim 10, further comprising a second control module to provide a second request to cease forwarding communications to the alternate communication device.

13. The system of claim 12, wherein the second control module sends the second request in response to detecting that the wireless communication device has moved out of range of the wireless beacon device.

14. The system of claim 10, wherein, when the first control module receives a second identifier associated with a second wireless beacon device, the first control module determines whether the second identifier is recognized based on the look up table, and, when the second identifier is recognized, the first control module provides a second request to forward communications to a second alternate communication device, wherein the second identifier identifies the second wireless beacon device, wherein the second alternate communication device is proximal to the second wireless beacon device, and wherein a second network address of the second alternate communication device is determined based on the second identifier.

15. The system of claim 10, wherein the identifier includes a user-selected identifier.

16. A wireless beacon device, comprising:
a wireless communication interface configured to wirelessly transmit a unique identification of the wireless beacon device to a mobile device located within a wireless coverage area of the wireless beacon device, wherein, when the wireless beacon device is recognized by the mobile device based on the unique identification and based on a look up table accessible to the mobile device, the mobile device selects an alternate network address corresponding to a second communication device based on the unique identification and forwards external communications to the second communication device via the alternate network address while the mobile device is within the wireless coverage area of the wireless beacon device, and wherein the unique identifier identifies the wireless beacon device.

17. The wireless beacon device of claim 16, wherein the unique identification includes a user-selected identification.

18. The wireless beacon device of claim 16, wherein, when a second mobile device enters the wireless coverage area of the wireless beacon device, the second mobile device determines whether the unique identification is recognized based on a look up table accessible to the second mobile device, and, when the unique identification is recognized by the second mobile device, the second mobile device selects the alternate network address corresponding to the unique identification and forwards external communications to the alternate network address while the second mobile device is within the wireless coverage area of the wireless beacon device.

19. The wireless beacon device of claim 18, wherein a communication device associated with the alternate network address provides a first distinctive notification of receipt of a first external communication redirected from the mobile device and a second distinctive notification of receipt of a second external communication redirected from the second mobile device.

20. The wireless beacon device of claim 16, wherein the wireless beacon device requests a user password before sending the unique identification.

* * * * *